UNITED STATES PATENT OFFICE 2,345,984

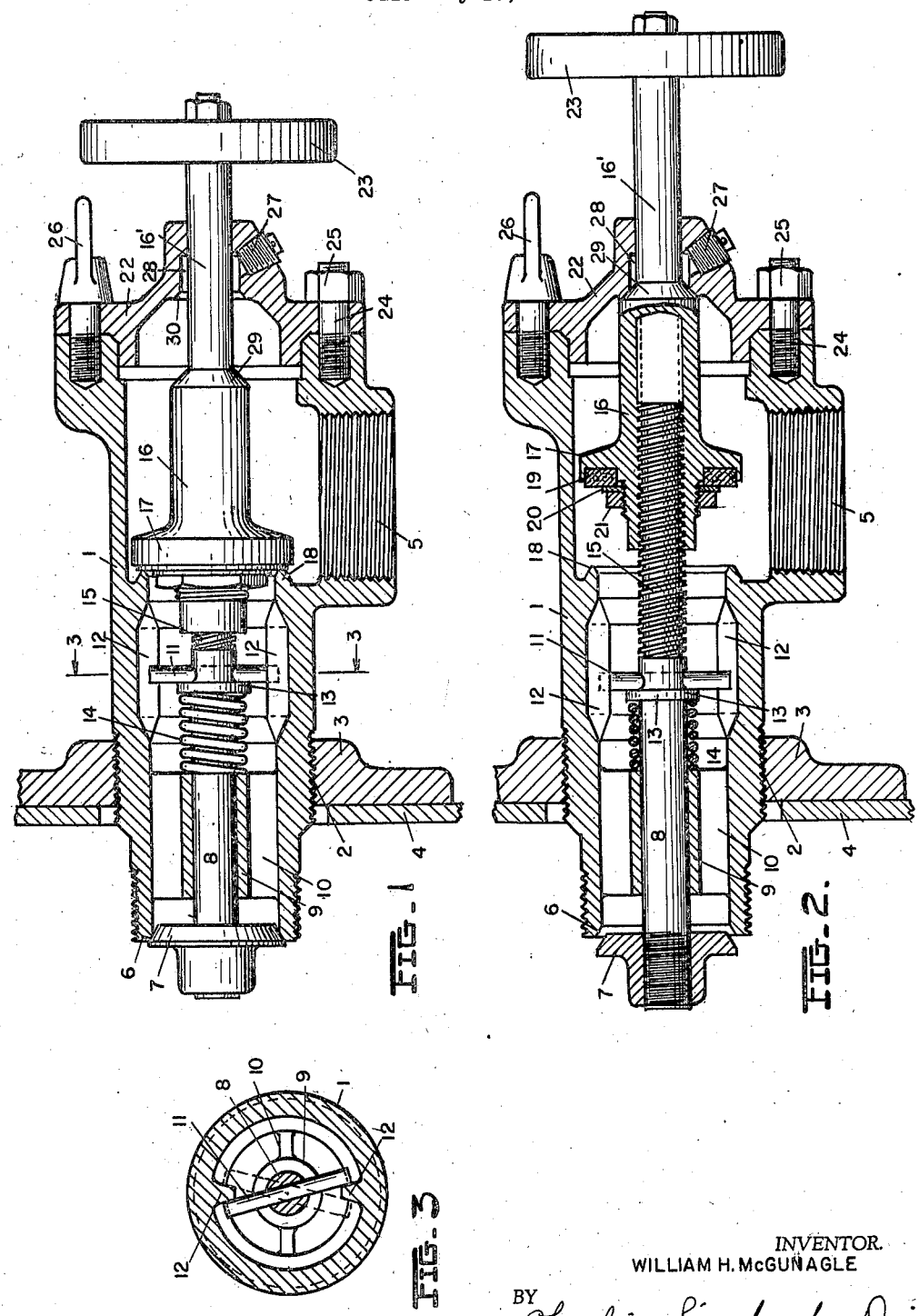

VALVE

William H. McGunagle, Cleveland, Ohio, assignor to The Johnston & Jennings Company, Cleveland, Ohio, a corporation of Ohio Application May 15, 1941, Serial No. 393,577

1 Claim. (Cl. 277—33)

The present invention relates to a valve having two valve closure members, both of which are operable from a single actuating means, such as a hand-wheel, or the like, and wherein one of the valve elements may be removed from the valve housing for the purpose of inspection, repair or re-facing, while the other valve element remains in closed position. The valve embodying the construction of my present invention is particularly adapted for use as a water draw-off valve in petroleum containers such as storage tanks and the like, inasmuch as necessary repairs to one of the valve elements may be made while liquid pressure is exerted upon the valve, or without the necessity of emptying the storage tank.

A further advantage of the valve construction of the present invention is that no liquid, such as water, is retained in the valve housing after the valve is closed or shut off, so that there will be no opportunity for having the valve rendered inoperable, or even destroyed, by water freezing therein. Furthermore, my invention renders possible the elimination of any valve stem packing which might require replacement from time to time.

Additional objects and advantages of my invention shall become apparent as the following description proceeds.

To the accomplishment of the foregoing and related ends, said invention then consists of the means hereinafter fully described and particularly pointed out in the claim, the annexed drawing and the following description setting forth in detail certain structure embodying the invention, such disclosed means constituting, however, but one of various structural forms in which the principle of the invention may be used.

In said annexed drawing:

Fig. 1 is a longitudinal, sectional view through the valve housing of a valve having the construction embodying the principle of my present invention; Fig. 2 is a longitudinal, sectional view through the valve housing and the valve elements, showing the latter in open position; and Fig. 3 is a transverse, sectional view taken substantially along the line 3—3 of Fig. 1.

Now referring more particularly to the drawing, the valve structure therein comprises a housing 1 of substantially cylindrical form, having a threaded portion 2, adapted to connect the valve to the threaded flange 3 on the shell 4 of an oil storage tank or the like. A threaded outlet opening 5 is provided in the side wall of the housing 1.

The inner end of the housing 1 has a valve seat 6 which is adapted to be engaged by the annular valve member or disc 7. The valve disc 7 is mounted on the end of the valve stem 8, which, in turn, extends through the cylindrical guide 9. The guide 9 is mounted in the housing 1 by means of the radial ribs 10.

A transverse pin 11 is carried by the valve stem 8 and is of sufficient length at its outer ends to contact with the inwardly extending abutments 12 on the inside wall of the housing 1. The pin 11 also serves as an abutment for the washer 13 against which one end of the coil compression spring 14 bears. The other end of the spring 14 bears against the end of the valve guide 9. The spring 14 thus exerts its pressure in such a direction as to urge the valve disc 7 towards closed position or towards engagement with its seat 6.

The valve stem 8 also has a threaded portion 15 which is adapted to engage with the interior of the second valve stem 16 which carries the valve element or disc 17. The latter is adapted to engage with the seat 18 which is located intermediate the inlet valve seat 6 and the outlet opening 5. A removable valve facing, in the form of a ring 19, is carried by the seat-contacting face of the valve disc 17. The facing ring 19 is removably installed on the disc 17, in the customary fashion, by means of the washer 20 and the nut 21.

The valve stem 16 has a reduced portion 16' which extends through an opening in the removable valve bonnet or cover 22. The cover 22 is mounted on the housing 1 by means of suitable fasteners such as the stud bolts 24 and nuts 25. Preferably, one of these nuts is in the form of the loop nut 26 through which the hasp of a padlock (not shown) may be inserted to engage also with an opening in the hand-wheel 23 to lock the valve in closed position and to prevent unauthorized tampering or manipulation of the latter. The drain plug 27 is located in the bonnet 22 and closes a hole leading to a recess 28 surrounding the valve stem 16'. The drain plug 27 is intended to be removed or replaced by a pipe nipple when the valve housing is installed at a position at right angles to that shown in the drawing (or in a vertical position) for draining the interior of the valve housing when the valve discs 7 and 17' are in closed position.

A beveled shoulder 29 is located at the end of the valve stem 16 and adapted to seat upon the complementary surface 30 in the cover 22.

The operation of the above described valve is as follows:

The valve parts are shown in closed position in Fig. 1. As the hand-wheel 23 is rotated in a direction corresponding to opening of the valve, the pin 11 contacts with the abutments 12 and prevents rotation of the valve stem 8. Continued rotation of the hand-wheel 23 unscrews the valve stem 16 from the threaded portion 15 of the valve stem 8, thus moving the valve 17 to open position, as shown in Fig. 2, or until such point as the shoulder 29 seats upon the complementary surface 30. Further rotation of the hand-wheel 23 in the same direction as before, continues to unscrew the valve stem portion 15, but since the valve stem 16 can no longer move in a righthand direction, the valve stem 8 must move in a lefthand direction, against the pressure of the spring 14, thus to open the valve disc 7.

In Fig. 2, the valve disc 7 is shown in a partially open position. When both of the valves 7 and 17 are opened, fluid flow through the valve housing 1 is effected. To close the valves, the hand-wheel is rotated in the opposite direction and the above-described movements are repeated in reverse order, viz.: The valve 7 first moves to closed position upon its seat 6 and the valve 17 is subsequently moved to closed position on its seat 18.

From the foregoing description, it will be seen that the inlet valve 7 closes first, so that water or any other fluid remaining in the housing 1 will have an opportunity to drain out through the outlet passage 5 (and likewise through the hole in which the drain plug 27 is located if the valve is in vertical position), preventing any undesired freezing of liquid in the interior of the valve. When it is desired to remove the valve 17, such as for inspection or renewal of the facing ring 19, the nuts 25 and the cover 22 are removed, and the stem 16, together with the valve disc 17, are unscrewed. During this removal, the compression spring 14 holds the valve 7 in closed position so that liquid cannot flow through the valve.

It will also be noted that no liquid sealing packing is required for the valve stem 16', since the shoulder 29, when seated upon the surface 30, operates to seal the stem 16' with respect to the housing 1. There is no opportunity for leakage past the valve stem 16' prior to such seating of the shoulder 29 because the valve 7 is still closed and cannot be opened until this seating contact occurs.

Other modes of applying the principle of my invention may be employed instead of the one explained, change being made as regards the structure herein disclosed, provided the means stated by the following claim or the equivalent of such stated means be employed.

I, therefore, particularly point out and distinctly claim as my invention:

A valve of the character described, comprising a cylindrical valve housing having one end terminating in an inlet opening and having an outlet opening in its side wall, a cover closing the opposite end of said housing, a valve adapted to close said inlet opening, a second valve and a seat for said second valve located in the interior of said housing at a point intermediate said inlet and said outlet openings, a stem for said inlet valve projecting into the interior of said housing, a guide bushing for said inlet valve stem carried by said housing and located between said inlet opening and said second valve seat, a transversely extending pin carried by said valve stem, a spring mounted between said bushing and said pin for urging said inlet valve to closed position, an abutment on said housing adapted to be contacted by said pin for limiting rotary movement of said inlet valve stem, a second valve stem for said second valve slidably and rotatably mounted in said cover, said inlet valve stem threadably engaging said second valve stem, whereby initial unthreading rotation of said valve stems with respect to each other operates to open said second valve while said inlet valve remains closed under pressure of said spring.

WILLIAM H. McGUNAGLE.